United States Patent
Lehn et al.

(10) Patent No.: US 11,401,914 B2
(45) Date of Patent: Aug. 2, 2022

(54) METHOD FOR OPERATING A WIND TURBINE

(71) Applicant: Wobben Properties GmbH, Aurich (DE)

(72) Inventors: Andreas Lehn, Bremen (DE); Dimitrios Bekiropoulos, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/900,570

(22) Filed: Jun. 12, 2020

(65) Prior Publication Data

US 2020/0400121 A1    Dec. 24, 2020

(30) Foreign Application Priority Data

Jun. 19, 2019 (EP) .................................. 19181222

(51) Int. Cl.
    *F03D 7/02*    (2006.01)
    *F03D 9/25*    (2016.01)
    *F03D 7/04*    (2006.01)

(52) U.S. Cl.
    CPC ........... *F03D 7/0224* (2013.01); *F03D 7/048* (2013.01); *F03D 9/25* (2016.05)

(58) Field of Classification Search
    CPC ........... F03D 7/0224; F03D 7/048; F03D 9/25
    See application file for complete search history.

(56) References Cited

U.S. PATENT DOCUMENTS

| 8,035,242 B2* | 10/2011 | Landa | F03D 7/0224 290/44 |
| 8,793,027 B2* | 7/2014 | Nyborg | F03D 7/048 700/287 |
| 9,845,790 B2* | 12/2017 | de Boer | F03D 9/25 |
| 2008/0030027 A1* | 2/2008 | Erdman | F03D 7/0224 290/40 R |

(Continued)

FOREIGN PATENT DOCUMENTS

EP    2063108 A2    5/2009

OTHER PUBLICATIONS

Van Der Hoek et al., "Comparison of Down-Regulation Strategies for Wind Farm Control and their Effects on Fatigue Loads," *IEEE Annual American Control Conference (ACC)*, 2018, pp. 3116-3121.

*Primary Examiner* — Courtney D Heinle
*Assistant Examiner* — Ryan C Clark
(74) *Attorney, Agent, or Firm* — Seed IP Law Group LLP

(57) ABSTRACT

Provided is a method for operating a wind turbine that includes a rotor operable with variable rotor speed and having rotor blades with adjustable pitch angles. Wind causes a rotor thrust acting on the rotor depending on the rotor speed and depending on a common pitch angle. In partial load, when the wind is below rated speed, the turbine is controlled by a rotor speed curve, defining the rotor speed for each operating point of the turbine. In a normal mode when the operation of the turbine is not throttled, a normal rotor speed curve in combination with a normal common pitch angle is used, and in a throttled mode when the thrust is to be limited, a throttled rotor speed curve, different from the normal rotor speed curve, in combination with a throttled common pitch angle, different from the normal common pitch angle, is used to reduce the thrust.

18 Claims, 5 Drawing Sheets

(56) References Cited

U.S. PATENT DOCUMENTS

| | | | |
|---|---|---|---|
| 2009/0295159 A1* | 12/2009 | Johnson | F03D 7/028 |
| | | | 290/44 |
| 2010/0286835 A1 | 11/2010 | Nyborg et al. | |
| 2013/0154263 A1* | 6/2013 | Attia | F03D 7/0224 |
| | | | 290/44 |
| 2013/0221934 A1* | 8/2013 | Wakasa | F03D 9/28 |
| | | | 322/20 |
| 2015/0152847 A1* | 6/2015 | Guadayol Roig | F03D 9/25 |
| | | | 290/44 |
| 2017/0022975 A1* | 1/2017 | De Boer | F03D 9/257 |
| 2017/0175709 A1* | 6/2017 | Daher Adegas | F03D 7/048 |
| 2017/0350369 A1* | 12/2017 | Evans | F03D 7/046 |
| 2017/0373533 A1* | 12/2017 | Beekmann | F03D 7/0276 |
| 2018/0045180 A1* | 2/2018 | Beekmann | F03D 7/048 |
| 2018/0347543 A1 | 12/2018 | Vadlamudi et al. | |
| 2019/0113020 A1 | 4/2019 | Messing et al. | |

* cited by examiner

METHOD FOR OPERATING A WIND TURBINE

BACKGROUND

Technical Field

The present invention concerns a method for operating a wind turbine. The present invention also concerns a corresponding wind turbine. The invention also concerns an arrangement of wind turbines. The invention is also directed to a wind farm.

Description of the Related Art

Wind turbines are well known, they produce electrical power from wind. In a normal operational mode a wind turbine produces as much power as possible according to the prevailing wind conditions up to a maximum power. Such maximum power maybe defined by the wind turbine and maybe a nominal power of the wind turbine. If there is not enough wind to reach such maximum power, i.e., if the wind speed is below rated wind speed, the wind turbine is operated in a partial load situation.

In such partial load situation the wind turbine is controlled by means of a rotor speed curve defining the rotor speed for each operating point of the wind turbine. There are different possibilities to implement such rotor speed curve but generally speaking the rotor speed according to such rotor speed curve is increasing with increasing wind speed.

Even in such partial load situation there may be situations and/or regulations forcing the wind turbine to limit the rotor thrust. Such rotor thrust is acting on the rotor of the wind turbine. Often a wind turbine is not just operated as a single wind turbine, but it is operated within a wind farm having a plurality of wind turbines. Depending on the wind direction a first wind turbine may be arranged just in front of a second wind turbine, i.e., the second wind turbine is in lee of the first wind turbine.

In such situation the rotor of the first wind turbine produces turbulences which act on the rotor of the second wind turbine. Depending on the wind speed such turbulences may be that high, that they stress the rotor of the second wind turbine. In such situation the first wind turbine shall reduce its operation such that its rotor thrust is reduced and as a consequence the turbulences produced by the rotor of the first wind turbine are also reduced. Accordingly, the stress on the rotor of the second wind turbine can be reduced.

However, it is also possible that reducing the rotor thrust of the first wind turbine makes sense in order to increase the overall power of the first and the second wind turbine. That is the case if the turbulences produced by the first wind turbine significantly reduce the power that can be produced by the second wind turbine and in that case it might be possible that reducing the thrust of the first wind turbine reduces the produced power by the first wind turbine by an amount that is smaller than the amount by which the power produced by the second wind turbine can be increased.

However, if the rotor thrust of a wind turbine needs to be reduced the rotor blades of its rotor are pitched partly out of the wind, e.g., by a few degrees or more. This pitching of the rotor blades leads to said reduced rotor thrust and accordingly the rotor speed is reduced according to the rotor speed curve. That is because the pitching of the rotor blades decreases the rotor thrust and such decrease of the rotor thrust has a similar effect as if the wind speed would decrease. Accordingly, a new rotor speed may result according to the rotor speed curve as if the wind speed would have decreased.

However, the actual wind speed has not decreased and accordingly the new rotor speed according to the rotor speed curve is in fact not adapted to the actual wind speed. In particular a tip speed ratio may result which is not as optimal as the tip speed ratio underlying the originally planned rotor speed curve.

A further result may be that less power is produced than could be possible even with reduced rotor thrust.

BRIEF SUMMARY

A technique is proposed which enables to reduce the rotor thrust but still provides the possibility to produce as much power as possible with respect to the reduced rotor thrust.

A method is provided. The method for operating a wind turbine is based on a wind turbine comprising a rotor operable with variable rotor speed. The rotor has rotor blades with adjustable pitch angles and the adjustable pitch angles are represented by a common pitch angle. The rotor may have three rotor blades and often the pitch angles of all rotor blades are the same and thus correspond to the common pitch angle.

According to the method for operating the wind turbine the wind turbine produces electrical power from wind. The wind causes a rotor thrust acting on the rotor depending on the rotor speed and depending on the common pitch angle. Accordingly, for a given wind speed a rotor thrust will result depending on the rotor speed and the common pitch angle.

In a partial load situation, when the wind speed is below rated wind speed, the wind turbine is controlled by means of a rotor speed curve. This rotor speed curve defines the rotor speed for each operating point of the wind turbine. Accordingly, the rotor speed is adjusted depending on the wind speed and according to such rotor speed curve. Such rotor speed curve may be set when designing the wind turbine.

The proposed method distinguishes a normal operational mode from a throttled operational mode. In a normal operational mode the operation of the wind turbine is not throttled and a normal rotor speed curve in combination with a normal common pitch angle is used. Such normal common pitch angle may even be a fixed pitch angle for any wind speeds below rated wind speed.

In the throttled operational mode the rotor thrust is to be limited. Accordingly, a particular situation and/or an external signal may lead to limiting the rotor thrust and thus change from normal operational mode to throttled operational mode. It is to be noted that the normal operational mode as well as the throttled operational mode are both part of the partial load situation.

Limiting the rotor thrust may mean that the rotor thrust is reduced. However, in some situations it may also mean that a limit for the rotor thrust is set even though such limited rotor thrust was not exceeded in the actual rotor operating point of the normal operational mode. However, most of the time limiting the rotor thrust will result in reducing the actual rotor thrust to said limited rotor thrust.

For the throttled operational mode it is suggested to use a throttled rotor speed curve. Such throttled rotor speed curve is different to the normal rotor speed curve. In addition the throttled rotor speed curved is used in combination with a throttled common pitch angle and this throttled common pitch angle is different to the normal common pitch angle.

This way by using the throttled rotor speed curve in combination with a throttled common pitch angle the rotor thrust can be reduced.

Accordingly, for the normal operational mode on the one hand and the throttled operational mode on the other hand there is each one rotor speed curve used. For a different throttled operational mode, i.e., for different amounts of the reduction of the rotor thrust there may be different throttled rotor speed curves.

It was realized that the normal rotor speed curve is optimal for the normal operational mode, as it is designed to be optimal for the normal operational mode, but it is not necessarily optimal when the rotor thrust is reduced, in particular when the common pitch angle is changed.

Accordingly, it is suggested to design at least one particular throttled rotor speed curve in combination with a throttled common pitch angle. As a simplified explanation the common pitch angle is changed in order to reduce the rotor thrust. In particular the throttled common pitch angle is designed such that with respect to the normal common pitch angle the rotor blades are pitched out of the wind, i.e., towards a feathered pitch angle. For such changed throttled common pitch angle the throttled rotor speed curve takes care of an optimal operation for such throttled pitch angle. In particular the throttled rotor speed curve is designed to provide a power optimal operational mode. In other words the throttled rotor speed curve is designed such that as much power is produced as is possible with such throttled common pitch angle.

According to one aspect a rotor speed curve defines a relationship between the rotor speed and the electrical power to be produced. In operation the rotor speed is determined, in particular measured, and according to the rotor speed curve a value of the electrical power is assigned to the particular rotor speed value. This electrical power is thus set by the wind turbine. This set electrical power results in a generator torque that influences the rotor speed. If this generator torque equals the torque produced by the wind acting on the rotor, a stable operating point is found. If these two torques are not identical the rotor speed will change and accordingly based on the rotor speed curve a new electrical power is set, until a stable operating point is found.

This way an operational point can be predefined by designing the rotor speed curve. This way the normal operational mode as well as a throttled operational mode can be defined by the particular rotor speed curve and the corresponding common pitch angle.

According to another aspect the rotor speed curve is defined as a relationship between the rotor speed and a generator torque to be set. Such rotor speed curve has a similar effect as explained above. The rotor speed will be determined, e.g., measured, and based on this determined rotor speed the particular generator torque is set which is assigned to this particular rotor speed according to the rotor speed curve. If this generator torque equals the torque resulting from the wind acting on the rotor, a stable operating point is formed. Otherwise the rotor speed changes and a new generator torque is set until such stable operating point is found. This way the operation of the wind turbine may also be predetermined using such a rotor speed curve. This way the normal operation as well as a throttled operation can be predetermined.

According to one aspect the rotor speed curve defines a relationship between the rotor speed and the wind speed. For such rotor speed curve the wind speed is measured and the rotor speed which is assigned to the particular wind speed according to the rotor speed curve is set. Setting the particular rotor speed in this case may be done by setting the generator torque and/or the electrical power. However, in this case the rotor speed will directly be set according to the rotor speed curve.

This way there may also be the normal operational mode as well as the throttled operational mode be predefined.

There may also be differently designed throttled operational modes, i.e., for differently throttled common pitch angles and for each of such throttled common pitch angle there may be a corresponding throttled rotor speed curve. This way the amount of reduction of the rotor thrust can be chosen according to the particular need and/or according to a signal asking for a particular reduction of the rotor thrust. One possibility is to provide such throttled rotor speed curve for many throttled common pitch angles, i.e., step wise in 0.2 degrees steps or 0.5 degrees steps for each throttled common pitch angle.

According to one aspect it is suggested that the rotor thrust is limited or reduced by increasing the throttled pitch angle with respect to the normal pitch angle and/or the throttled speed curve is designed such that for a given throttled pitch angle the produced electrical power is maximized. In particular both aspects are combined and as explained above the throttled pitch angle basically leads to reducing the rotor thrust whereas the corresponding throttled speed curve maximizes the produced electrical power for such selected throttled pitch angle.

This way even in a throttled operational mode the electrical power to be produced can be maximized in a simple an efficient manner.

According to one aspect the operation of the rotor is characterized by a power coefficient Cp and a rotor thrust coefficient Ct, a relationship between the power coefficient and the thrust coefficient is defined as an optimization criterion and the throttled rotor speed curve is designed such that the optimization criterion is maximized. By defining such optimization criterion the power coefficient and the rotor thrust can both be considered when designing the throttled rotor speed curve. This way the optimization criterion is selected, these coefficients can be considered differently, or similar to each other. Thereby a focus can be put on having a high power production or on having small rotor thrust, i.e., small stress on the wind turbine. Alternatively, the produced power and the stress on the wind turbine can be considered in the same manner.

According to one aspect it is suggested that the optimization criterion is defined as a ratio of the power coefficient Cp to the rotor thrust coefficient Ct and accordingly the throttled rotor speed curve is designed such that a ratio of the power coefficient Cp to the rotor thrust coefficient Ct is maximal. It was found that for optimizing the produced electrical power such ratio of the power coefficient Cp to the rotor thrust coefficient Ct can be optimized and thus made maximal. Such optimization criterion puts the focus on the power coefficient and the rotor thrust coefficient equally.

The power coefficient Cp is known or can be derived for a particular rotor blade, its pitch angle and the tip speed ratio $\lambda$. Based on that said ratio of the power coefficient Cp to the rotor thrust coefficient Ct is considered and the operation of the rotor is designed such, that such ratio is maximal. Such maximum may be found for each operational point, i.e., for each wind speed such optimal operational point is found. However, it was found that it can be enough to find such optimal operational point only for each tip speed ratio $\lambda$ as the rotor speed curve Based on that a throttled rotor speed curve for each throttled common pitch angle can be designed by collecting many of such optimal operational points and based on that the wind turbine can be operated in a throttled operational mode but with maximal power output.

According to a further aspect the optimization criterion is defined by a ratio of a first function depending on the power coefficient Cp to a second function depending on the rotor thrust coefficient Ct. By defining such first and second function the power coefficient Cp and the thrust coefficient Ct will receive a different weighting. Each function could be defined by a polynomial function, e.g., the first function can be defined by $a*Cp^2+b*Cp+c$, and the second function can be defined by $d*Ct^2+e*Ct+f$.

One possibility is to use for the first and second function just a power of Cp and a power of Ct, e.g., $Cp^3$ as the first function an $Ct^2$ as the second function, resulting in a optimization criterion oc being $oc=(Cp^3)/(Ct^2)$. This way the power coefficient Cp and the thrust coefficient Ct will also receive a different weighting. In the example given, the weighting of the power coefficient Cp is higher than that of the thrust coefficient Ct.

Accordingly one aspect is to use as the optimization criterion a ratio of a weighted power coefficient Cp to a weighted rotor thrust coefficient Ct. Picking the particular power of each coefficient is one possibility to set the weighting.

Accordingly and as suggested according to one aspect the optimization criterion may be given by the formula:

$$oc=(Cp^x)/(Ct^y).$$

In that formula x and y may be positive integer but the may also just be any real number.

Preferably x and y are different ($x \neq y$) as that way a weighting may be defined by selecting x and y.

According to one aspect the throttled rotor speed curve is designed such that depending on the throttled pitch angle a tip speed ratio λ is set such that the electrical power is maximized. In particular this is done such that the ration of the power coefficient Cp to the rotor thrust coefficient Ct is maximal. Accordingly, a tip speed ratio λ is adapted to each throttled common pitch angle. This way the electrical power can be maximized.

This suggestion is also based on realizing that a throttled and thus changed common pitch angle leads to a better operation if the tip speed ratio is adapted accordingly. The tip speed ratio also influences the angle of attack of the wind at the rotor blade, i.e., the angle that results from the wind speed on the one hand the speed of the rotor blade on the other hand. If the pitch angle changes it was found to be better that the angle of attack shall also change and accordingly as the wind speed cannot be changed the rotor speed and thus the tip speed ratio λ is adapted to the particularly throttled pitch angle. It is to be noted that any explanations regarding the throttled pitch angle shall be understood as also being directed to the throttled common pitch angle.

According to one aspect the throttled rotor speed curve is designed by applying an optimization criterion and the optimization criterion can be illustrated as follows. A pitch angle curve showing the common pitch angle depending on the tip speed ratio and depending on the ratio of the power coefficient to the rotor thrust coefficient Ct is suggested. Accordingly, this illustration can form a three dimensional diagram. Accordingly, all possible pitch angles depending on the tip speed ratio and depending on the ratio of the power coefficient Cp to the rotor thrust coefficient Ct form a three dimensional surface.

The optimal operation point of the throttled mode can be found by following the gradient on this three dimensional surface, i.e., the optimal operation points of the throttled modes follow the highest incline on the three dimensional surface. Accordingly, the optimization criterion can basically be understood as finding this gradient, i.e., finding the highest incline on the three dimensional surface. If the curve is found such that it does follow the gradient, then an optimum is found using said optimization criterion.

Based on this three dimensional surface tuples of tip speed ratio values and pitch angle values correspond to a curve following the gradient, i.e., the highest incline on the three dimensional surface. In other words the tuples of the tip speed ratio values λ and pitch angle values can be understood as x- and y-coordinates of the three dimensional surface. This way a curve can be found which is a curve of said tuples. Once such curve of these tuples of tip speed ratio values and pitch angle values is found each tip speed ratio can be used to calculate a corresponding rotor speed, as the tip speed ratio is the ratio of the speed of the blade tips to the wind speed. Basing on the so found optimal operation points, different pitch angle curves and rotor speed curves can be derived according to the thrust levels of interest.

It is suggested to use this three dimensional surface for different wind speeds, as it can be assumed that the tip speed ratio λ is the same for different wind speeds. This way the optimization can be simplified.

However, according to one aspect different three dimensional surfaces may be used for wind speeds at which the tip speed ratio λ is not constant. It is important to mention that the tip speed ratio λ is set according to the design of the wind turbine and it is set by means of the control of the wind turbine, in particular by defining the relevant rotor speed curve. That applies for the normal rotor speed curve as well as for each throttled rotor speed curve.

One idea is thus, to use this ratio of the power coefficient Cp to the rotor thrust coefficient Ct. This coefficient shall always be maximal. It was found that based on this ratio an optimization and thus an optimization criterion has been found to be much better than considering the power coefficient Cp and the rotor thrust coefficient Ct each as separate variables. Accordingly, instead of considering these two variables said the ratio of these two variables is considered and it was found that considering this ratio is efficient and is also enough in order to find said optimal rotor speed curve.

According to one aspect the rotor speed curve is designed depending on the ratio of the power coefficient Cp to the rotor thrust coefficient Ct. The underlying idea has been explained above. However, according to this aspect the ratio of the power coefficient to the rotor thrust is directly incorporated into the design of the rotor speed curve.

According to one aspect a full load situation is also considered. In such full load situation the wind speed is at or above rated wind speed. In such full load situation it is suggested according to one aspect to operate the wind turbine in the normal operational mode with rated rotor speed, with a rated generator torque and with rated power, and to operate the wind turbine in throttled operational mode with a throttled rotor speed being below the rated rotor speed and with increased generator torque being above rated generator torque and/or with rated power.

Accordingly, there is also suggested to optimize the electrical power to be produced in a throttled operational mode for wind speeds above rated wind speed. For wind speeds above rated wind speed the electrical power to be produced is usually not limited by the wind but by technical limits of the turbine. In particular there are limits for the wind turbine regarding rotor speed, generator torque and electrical power to be produced. The electrical power to be produced can also be depicted as generator power.

Accordingly, if the rotor speed needs to be throttled the generator power will also be reduced as the generator power is the product of rotor speed and generator torque. Accordingly, the generator power is not limited by aerodynamic measures, but by technical limits. However, it was found that in such throttled operation the generator torque can be increased above rated generator torque and this way the electrical power can be increased. Such increase of generator torque is possible, as the generator power is lower than for a normal rated operational point.

Any limits set for the generator torque assume rated power. Accordingly, the original design of the wind turbine does not suggest exceeding the rated generator torque. But it was realized that in this particular situation the generator torque may be increased. Optimally, the generator torque might be that high that rated power may be reached or at least that high that the generator power is higher than it would be for this throttled operational mode when the generator torque is not exceeding generator torque.

Accordingly, even in a full load situation the generation of electrical power can be increased in case of a throttled operational mode.

According to one aspect a set of throttled rotor speed curves is provided, each throttled rotor speed curve comprises a common pitch angle and for operating the wind turbine one throttled rotor speed curve of the set of throttled rotor speed curves is selected depending on the amount of rotor thrust to be limited. This way it is possible to provide optimal power production for basically any throttled common pitch angle and any wind speed below rated wind speed.

In order to provide such solution it is suggested to provide such set of throttled rotor speed curves with assigned throttled common pitch angle in a storage and/or microprocessor in the wind turbine. The wind turbine can then select one of this throttled rotor speed curves. One possibility is that the wind turbine changes the pitch angle to a throttled common pitch angle to get the wanted reduction in the rotor thrust and based on the finally set throttled common pitch angle select the throttled speed curve assigned to said throttled common pitch angle.

According to one aspect it is suggested that in a transient operational situation where the operation shifts from partial load situation to a full load situation the throttled pitch angel increases with increasing wind speed. Preferably the pitch increases depending on an increase of the produced electrical power, in particular with a predefined pitch angle to power slope.

This aspect is based on the assumption that in a partial load situation the pitch angle, be it a normal pitch angle or throttled pitch angle, is basically constant, whereas in the full load situation the pitch angle needs to be increased with increasing wind speed in order to control the wind turbine on rated power and rated rotor speed. However, in a transient operational situation where the wind speed has not yet reached rated wind speed the pitch angle is increased, i.e., is increased before the wind speed reaches rated wind speed. This may be at a wind speed of 10% below rated wind speed. For a throttled mode operation it is thus suggested to also increase the throttled pitch angle before the wind speed has reaches rated wind speed, e.g., at a wind speed of 10% below rated wind speed. This is also suggested for a situation where a throttled operational mode is suggested in order to reduce the overall load on the wind turbine as such, i.e., not reduce the stress on a further wind turbine in lee, but to reduce the stress on the actual wind turbine.

When changing the throttled pitch angle in this transient operational situation it is also suggested to switch accordingly to other throttled rotor speed curves, i.e., to throttled rotor speed curves assigned to the changed throttled common pitch angle.

According to one aspect such change of the pitch angle is done such that a predefined pitch angle to power slope is given and such predefined pitch angle to power slope defines an increase of the pitch angle of a particular value with respect to an increase of generator power with respect to a particular value, e.g., the pitch angle is increased by e.g., 0.3° per 100 kW.

According to one aspect the throttled operation is chosen depending on at least one of the following criteria or information. One criteria or information is an azimuth position of the wind turbine. According to such azimuth position of the wind turbine the wind direction can be determined and accordingly it can be determined whether a second wind turbine is behind the wind turbine, i.e., if the second wind turbine is in lee of the actual wind turbine. In that case the wind turbine may produce turbulences which affect such second wind turbine in lee. In order to avoid or reduce such turbulences a throttled operation may be chosen.

Another criteria or information is a measured or determined wind speed. If the wind speed is small, a throttled operation may not be necessary, whereas with high wind speed such throttled operation may be necessary and can then be chosen dependent on the measured or determined wind speed.

Another criteria or information is a measured or determined intensity of gustiness or a turbulence intensity. If there is a high intensity of gustiness or turbulence intensity a throttled operation may be chosen in order to reduce any too high load on the wind turbine.

Another criteria or information is a measured or determined wake effect, according to which the wind turbine influences a wind field of a further wind turbine arranged in lee of the wind turbine. According to this aspect any influence of the wind turbine in lee may directly be determined. One possibility is that the further wind turbine which is arranged in lee measures such wind field and transmits as measured data to the wind turbine which may depend on such measurement to be put into said throttled operation.

A further criteria or information may be a signal received from a further wind turbine arranged in lee of the wind turbine. Such further wind turbine in lee may measure the wind field as explained above. But it may also measure any loads it receives, i.e., loads on the rotor blades, or it may just compare its output power to the output power which could be produced according to the prevailing wind condition. One possibility is that the further wind turbine arranged in lee directly sends a signal commanding the actual wind turbine to switch over to throttled operation. It is also possible that the signal gives particular values for the throttled common pitch angle or throttled rotor speed.

One possibility for the criteria or information is to have a signal received from a central farm controller of a wind farm, if the wind turbine is part of the wind farm. Such central farm controller may measure wind direction and wind speed and determine whether a wind turbine produces high turbulences for a wind turbine being arranged in lee of said actual wind turbine. However, the central farm controller may also monitor which wind turbine is in operation and in case said further wind turbine being arranged in lee of the actual wind turbine is for any reason not operating, the central farm controller may also consider this and in that case may decide that switching into the throttled operation is not necessary.

One criteria or information may also be a requirement for reducing noise emission. It was found that reducing the rotor thrust by means of said throttled operation also results in reducing noise emission. Accordingly, if there is a requirement for reducing noise emission, such requirement can be met by switching into the throttled operation. Accordingly, in case of a requirement for noise reduction said throttled operation with maximize power output may also be implied to meet such requirement for reducing noise emission.

A wind turbine is provided. Such wind turbine is designed as explained above and it comprises a turbine control adapted to operate the wind turbine. The turbine control is also adapted to operate the wind turbine in a partial load situation. And the turbine control is adapted to operate the wind turbine according to any of the aspects explained above.

Provided is an arrangement of wind turbines, including a wind farm comprising a first wind turbine according to any of the wind turbines explained above, comprising a second wind turbine arranged in proximity of the first wind turbine, and communication interface connecting the first and the second wind turbine to exchange information to be used for operating at least the first wind turbine.

The second wind turbine is thus arranged in the proximity of the first wind turbine such that depending on the wind direction the second wind turbine will be arranged in lee of the first wind turbine and will be affected by turbulences produced by the first wind turbine depending on the wind speed. In that case the second wind turbine may communicate with the first wind turbine in order to make the first wind turbine switch into a throttled operational mode in order to reduce the turbulences affecting the second wind turbine.

Provided is a wind farm comprising a plurality of wind turbines and at least one of the wind turbines is designed as explained above with respect to any of the explained aspects which are directed to a wind turbine. The wind farm may also have a central controller in order to control the wind turbines as explained respect to any of the embodiments mentioned above.

BRIEF DESCRIPTION OF THE SEVERAL VIEWS OF THE DRAWINGS

The invention will now be explained by way of example based on embodiments and using the enclosed figures.

DETAILED DESCRIPTION

Figure 1:
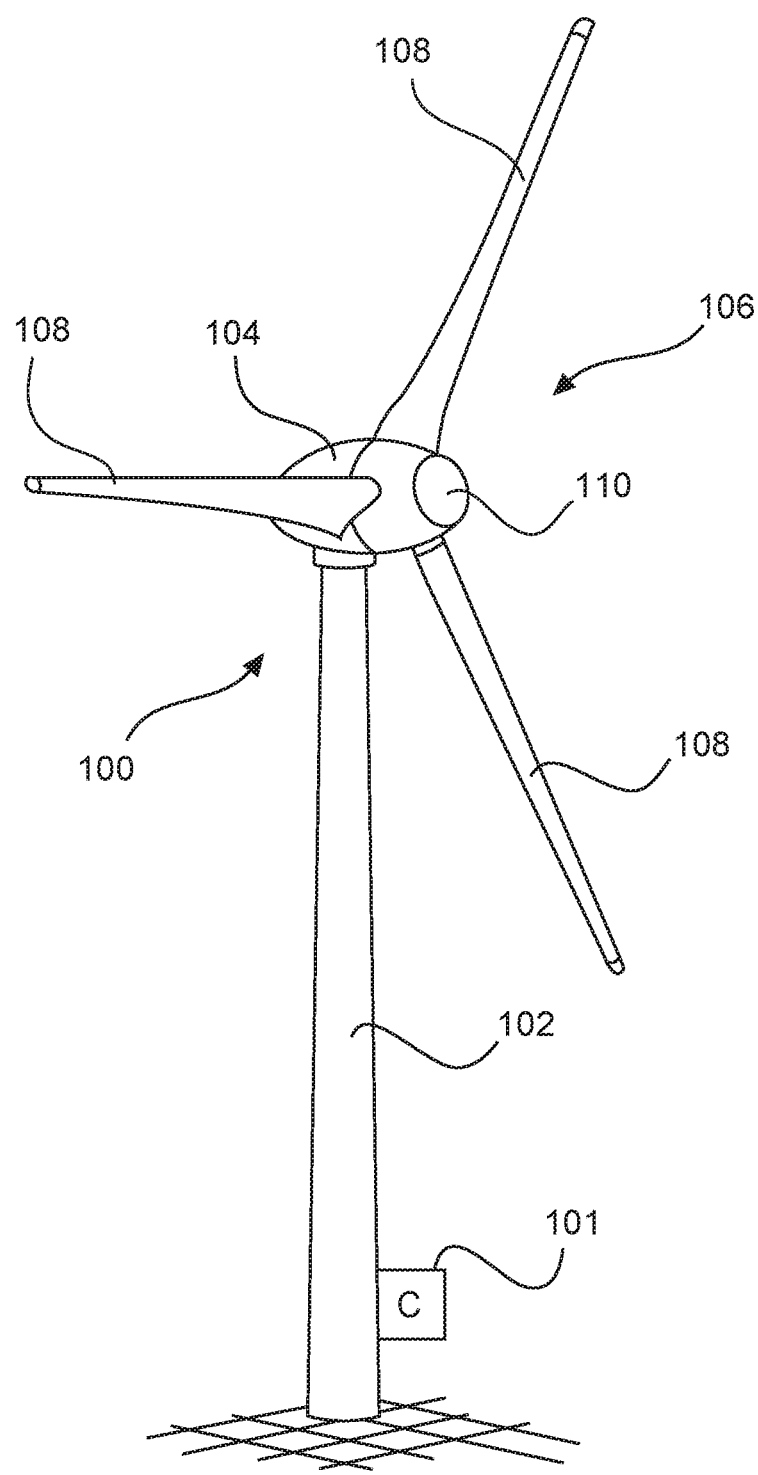
FIG. 1 shows a wind turbine in a perspective view.

FIG. 1 shows a wind turbine 100 comprising a tower 102 and a nacelle 104. A rotor 106 having three rotor blades 108 and a spinner 110 is arranged on the nacelle 104. The rotor 106 is set in rotation motion by the wind during operation and drives a generator in the nacelle 104 as a result.

Figure 2:
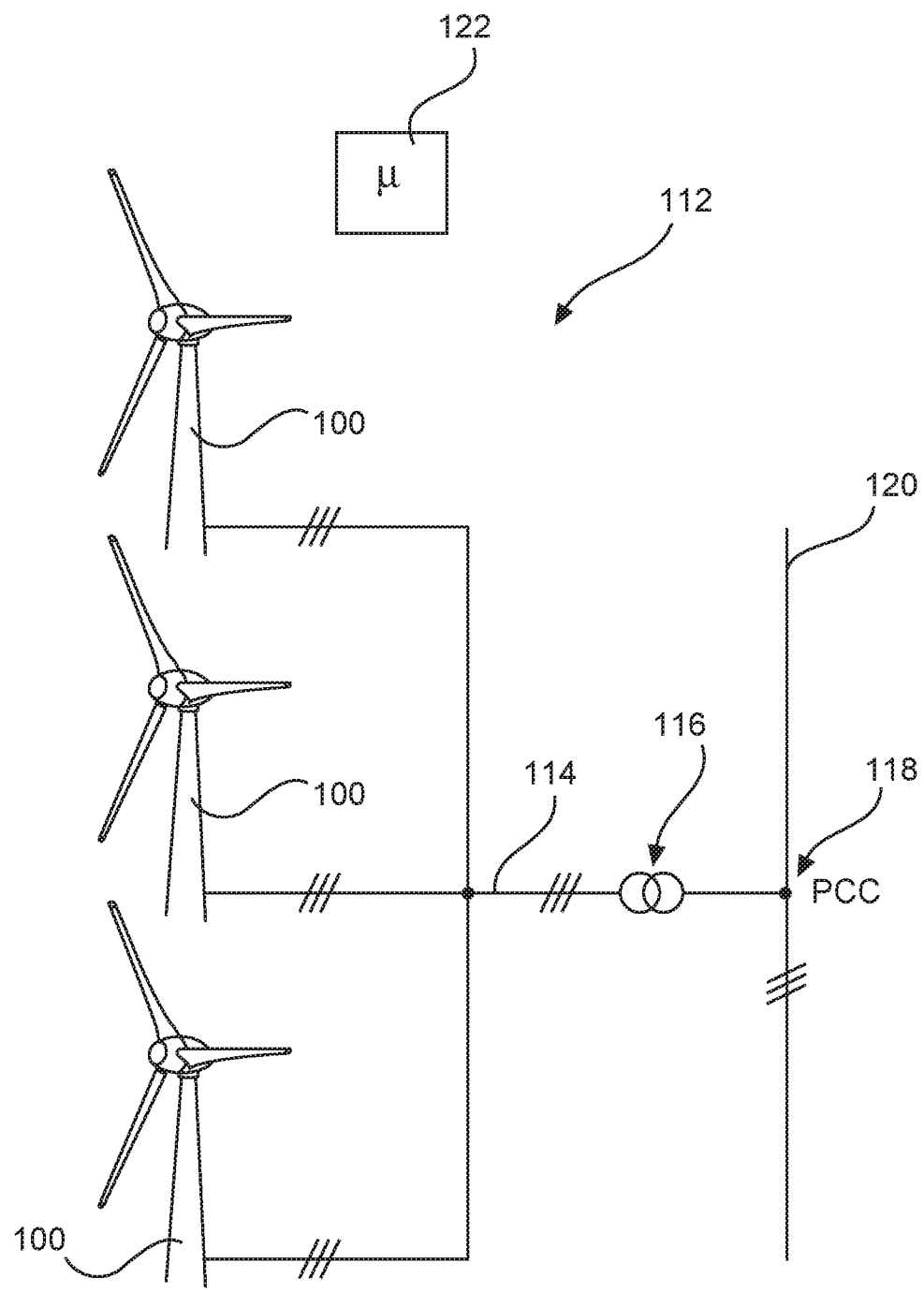
FIG. 2 shows a wind farm schematically.

FIG. 1 also illustrates a communication interface 101, which may be used to communicate with other wind turbines 100 and/or to communicate with a central controller, as is illustrated as a central controller 122 in FIG. 2. Any transmission lines for communication, if the communication is not running wirelessly, are not shown.

FIG. 2 shows a wind farm 112 having, just as an example, three wind turbines 100, which may be similar or different. Thus, said three wind turbines 100 may represent basically any number of wind turbines of a wind farm 112. Each wind turbine 100 provides their power, in particular the generated current using an electrical farm network 114. Thereby the generated currents or generated power of each wind turbine 100 respectively will be sum up. Often there is a transformer 116 transforming the voltage of the wind farm to a higher level, in order to feed in the overall current or overall power respectively at the feed in point 118 into the electrical supply grid 120. The feed in point 118 may also be depicted as point of common coupling (PCC).

The wind farm 112 also comprises a central controller 122 in order to control the wind turbines 100. The central controller 122, which may be a processor, server, computer or microcontroller, among others, is adapted to communicate with each wind turbine 100 even though any transmission lines are not shown. However, such communication may use such transmission lines or may operate wirelessly.

Figure 3:
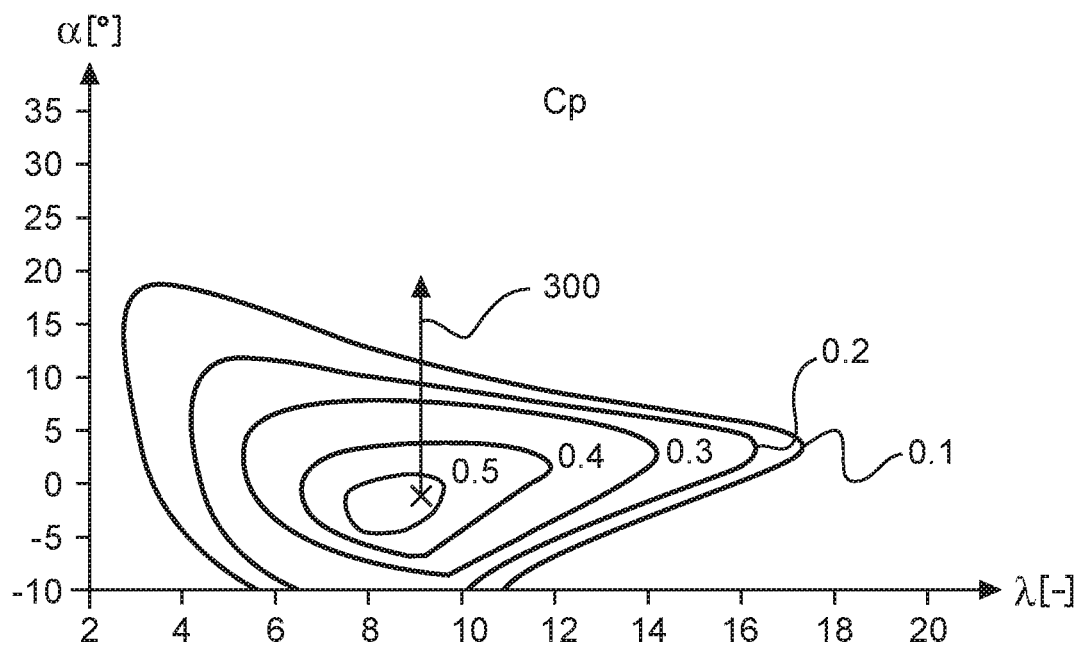
FIG. 3 shows in a diagram the power coefficient depending on the pitch angle and tip speed ratio.

FIG. 3 shows a diagram having the tip speed ratio λ at the axis of abscissae and the pitch angle α and the axis of ordinates. In this diagram any line refers to a power coefficient Cp having identical value. Accordingly, each line illustrates all pairs or tuples of tip speed ratio λ and pitch angle α having the same power coefficient Cp.

In FIG. 3 an arrow 300 indicates an increase of the pitch angle α for throttling the operation of the wind turbine. Accordingly, the pitch angle is increased, but the rotational speed and thus the tip speed ratio λ is not adapted. Accordingly, the power coefficient Cp is reduced, which is not quite optimal.

Figure 4:
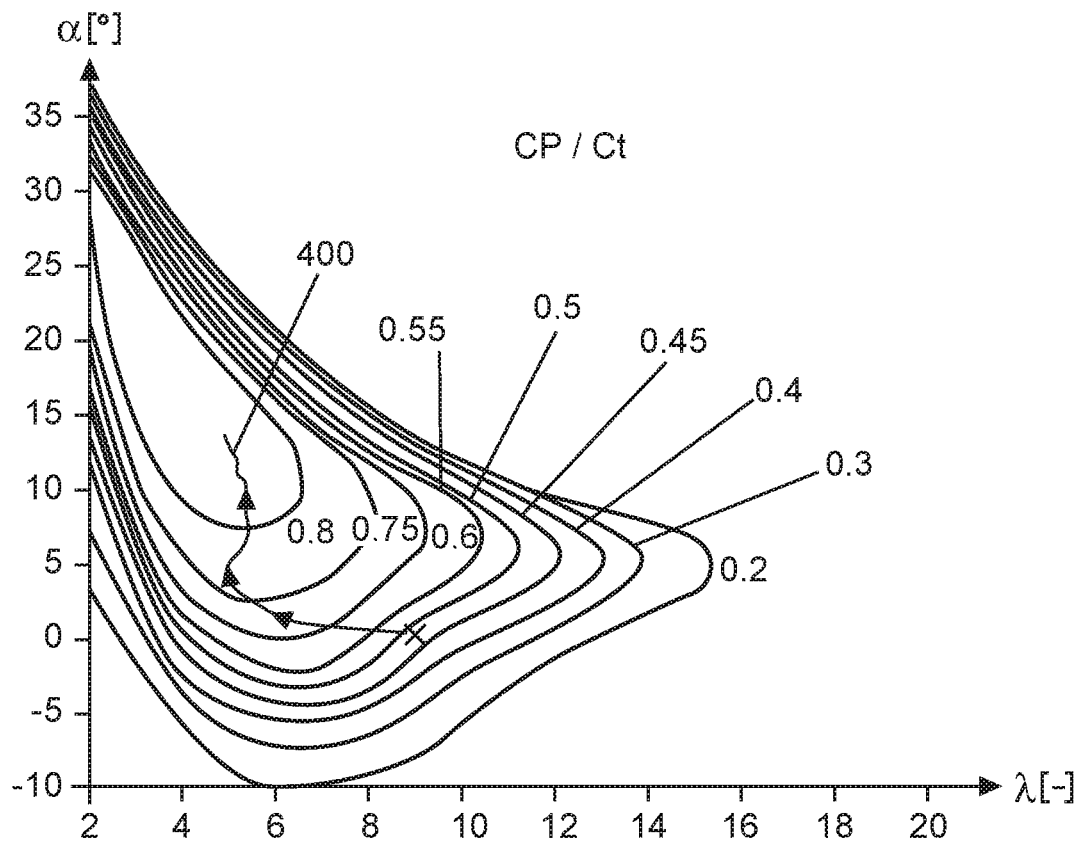
FIG. 4 shows a diagram of a ratio of the power coefficient to the rotor thrust coefficient depending on the pitch angle and the tip speed ratio.

In order to improve that, a solution is proposed as illustrated in FIG. 4. FIG. 4 also shows a diagram with the tip speed ratio λ at the axis of abscissa and the pitch angle α at the axis of ordinate. However, instead of showing the power coefficient Cp a ratio of the power coefficient Cp to the rotor thrust coefficient Ct is shown, i.e., the ratio Cp/Ct is shown. The diagram for this ratio Cp/Ct shows lines of equal values. Accordingly, each line shows all pairs or tuples for the tip speed ratio γ and the pitch angle α that correspond to the same ratio Cp/ct.

Similar to the starting point marked by an x according to FIG. 3 a starting point also marked with an x is shown in FIG. 4. However, it is suggested not just to increase the pitch angle α in case of entering in a throttled operation, but also to adapt the tip speed ratio λ. It is suggested to do this in such a way that the ratio of the power coefficient Cp to thrust coefficient Ct, i.e. the ratio Cp/Ct becomes optimal. This way an operating point can be found not only having an decreased thrust, but also providing maximum power generation for such reduced thrust.

In order to find such optimal, i.e. maximum ratio of Cp/Ct, the change of each pair or tuple of tip speed ratio λ and pitch angle α shall follow the gradient, i.e. the largest incline of said ratio of Cp/Ct.

That is illustrated by the trajectory 400. Such trajectory 400 theoretically crosses all lines of identical value for Cp/Ct orthogonally. However, only due to illustrative reasons FIG. 4 does not seem to show such orthogonally crossing. The trajectory 400 also includes some arrows in order to show the direction of the change of the corresponding operational point.

FIG. 4 shows a diagram of a ratio of the power coefficient to the rotor thrust coefficient depending on the pitch angle and the tip speed ratio. Accordingly, for finding a good operational point with reduced thrust it is suggested to use a characteristic diagram not as shown in FIG. 3 but having a power coefficient Cp normalized with respect to the thrust coefficient Ct. This way not only the thrust is reduced but it is also taken care for an optimal power to be generated.

Figure 5:
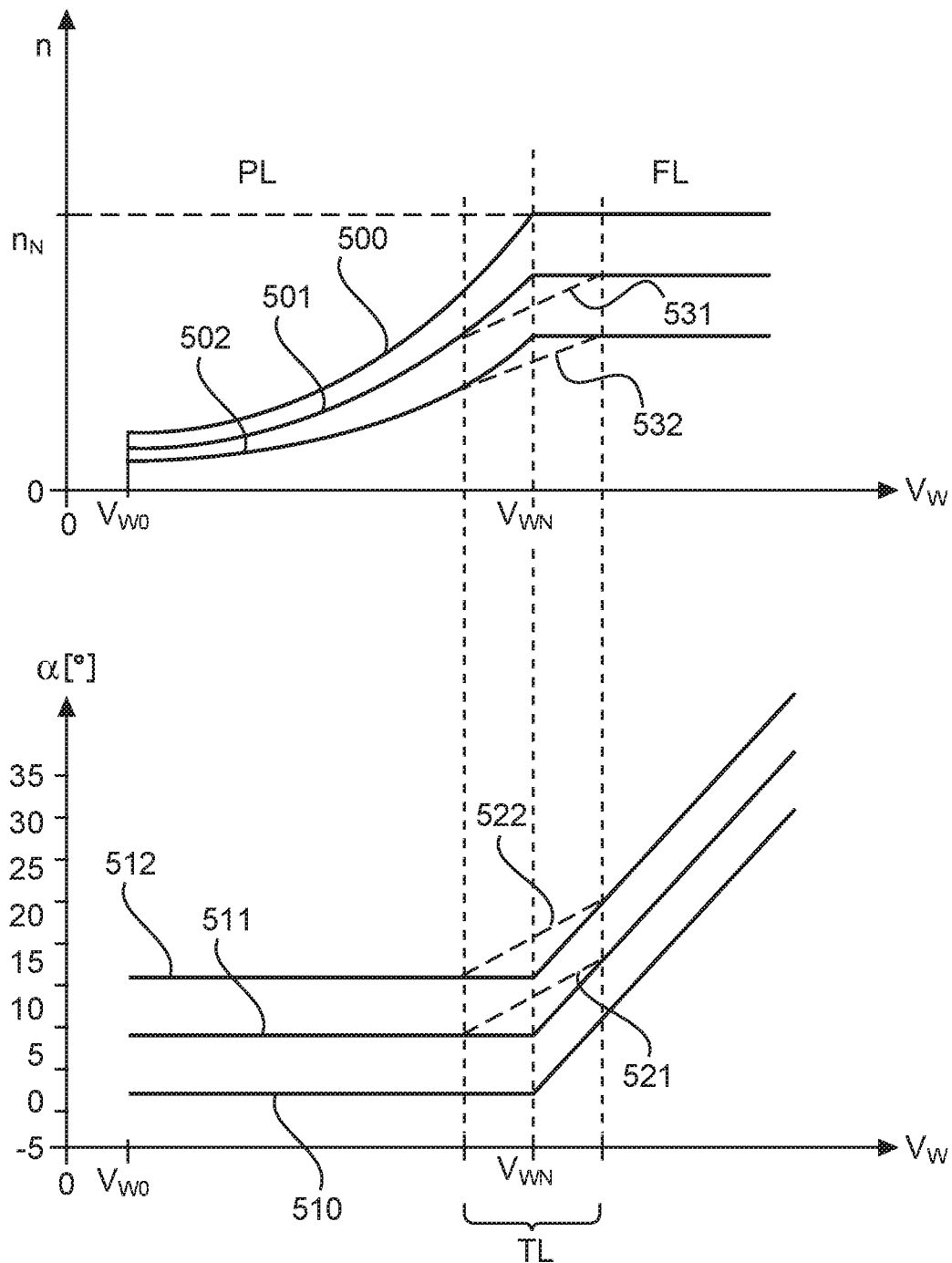
FIG. 5 shows two diagrams with a first diagram showing a set of rotor speed curves and a second diagram showing a set of pitch angle curves.

Based on that rotor speed curves can be derived as shown in the upper diagram of FIG. 5. Accordingly said upper diagram of FIG. 5 shows a normal rotor speed curve 500 and a first and second throttled rotor speed curve 501 and 502. These rotor speed curves 500, 501 and 502 are designed as the rotational speed n depending on the wind speed $V_W$. Said diagram also distinguishes between a partial load situation PL and a full load situation FL. The partial load situation is directed to the situation when the wind speed $V_W$ is below nominal wind speed $V_{WN}$. The operation of the wind turbines starts at a minimum wind speed $V_{W0}$ which is necessary in order to start the wind turbine.

The lower diagram of FIG. 5 shows a curve for a normal common pitch angle 510 and a first and second curve for a throttled common pitch angle 511 and 512. The normal common pitch angle 510 corresponds to the normal rotor speed curve 500 and the first and second throttled common pitch angle 511 and 512 correspond to the first and second throttled rotor speed curve 501 and 502 respectively.

Accordingly, it is suggested to operate the wind turbine according to the curve for a normal common pitch angle 510 using the normal rotor speed curve 500. According to the example shown the normal common pitch angle 510 has the constant value of 0 and that can correspond to the starting point X shown in FIG. 4. However, in other embodiments the normal common pitch angle may also have other values, such as 3° to give one example. It might also be possible that the normal common pitch angle is not constant for the whole partial load situation.

However, in order to reduce rotor trust the normal common pitch angle 510 may be changed to the first throttled common pitch angle 511. Accordingly, the pitch angle α in the diagram of FIG. 5 is increased by 5° but such high increase is only picked for illustrative reasons and instead such changes are more likely to show values of 0.5° for each change and thus for each 0.5° change of the pitch angle a throttled rotor speed curve may be assigned. Concurrently with changing the pitch angle it is thus suggested to also change to a corresponding throttled rotor speed curve. Accordingly when changing to the first throttled common pitch angle 511 the rotor speed curve shall also be changed to the first throttled rotor speed curve 501. If it turns out that the rotor thrust shall be reduced even further the pitch angle may be changed to the second throttled common pitch angle 512 and the rotor speed curve may also be changed to the second throttled rotor speed curve 502. Further changes to higher pitch angles may be possible as well as smaller changes. For smaller changes of the pitch angle there may also be throttled rotor speed curves between the first and second throttled rotor speed curves. Alternatively such rotor speed curves or single values thereof may be interpolated.

Said first and second throttled rotor speed curves 501 and 502 may each be derived as explained with respect to FIG. 4. Accordingly a diagram as shown in FIG. 4 may be generated and used for different wind speeds and for such different wind speeds a tip speed ratio λ may be selected each as shown in the diagram of FIG. 4. To explain this based on the two examples of FIG. 5, i.e. for a throttled common pitch angel of 5° and a throttled common pitch angle of 10° the process works as follows.

In a similar way all tip speed ratios λ for the particular pitch angle of 10° may be used to calculate the second throttled rotor speed curve 502. Of course, the rotor speed n can easily be calculated from the tip speed ratio α and the wind speed $V_W$ according to the formula n=λ·$V_W$/2πr, with r being the radius of the rotor.

FIG. 5 also shows the full load situation FL. Accordingly, the normal rotor speed curve 500 reaches the nominal rotor speed $n_N$, shown as a horizontal line. The first and second throttled rotor speed curves 501 and 502 may also switch over to a horizontal line, i.e. to a constant value, which may be below nominal rotor speed $n_N$.

The curves for the common pitch angle 510, 511 and 512 will all increase with further increasing wind speed $V_W$.

However, according to one embodiment it is suggested to increase the throttled common pitch angle before the wind speed $V_W$ reaches the nominal wind speed $V_{WN}$. This is indicated by the dashed lines 521 and 522 respectively. This way it is possible to avoid highest loads in particular at nominal wind speed $V_{WN}$. For such amended first and second curve for throttled common pitch angel 521 and 522 respectively it is suggested to also amend the corresponding first and second throttled rotor speed curve 501 and 502. This is indicated by the dashed lines 531 and 532 in the above diagram of FIG. 5. Such amendment of the first and second throttled rotor speed curve 501 and 502 depending on the chosen pitch angle can also be done by using the concept explained with respect to the diagram of FIG. 4. Such increase of the throttled common pitch angle before the wind speed $V_W$ is suggested for a transient Situation TS. Such transient Situation TS may start at a wind speed below rated wind speed, preferably in the range of 1% to 10% below rated wind speed and may end at a wind speed at or above rated wind speed, preferably in the range of 1% to 10% above rated wind speed.

It is also to be noted that FIG. 5 shows in the upper diagram just one possibility of a rotor speed curve, i.e. the rotor speed being given as a curve depending on the wind speed. Other possibilities are to give a rotor speed curve depending on the power to be produced. And a further possibility is to have a rotor speed curve depending on the generator torque to be set.

Figure 6:
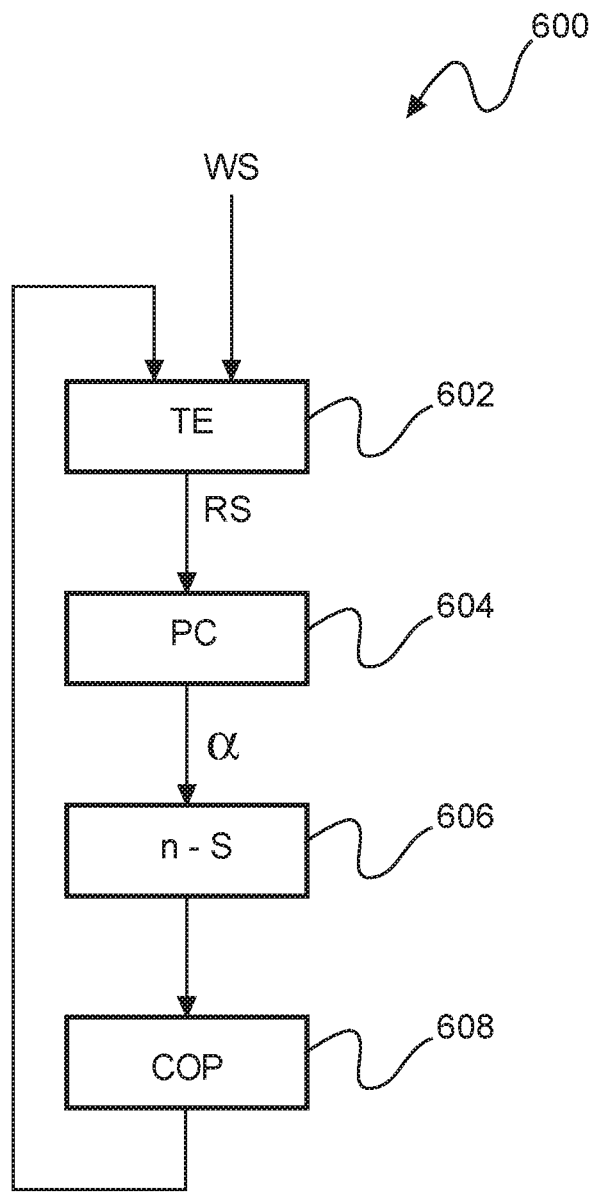
FIG. 6 shows a flow chart for illustrating a method for operating a wind turbine.

FIG. 6 illustrates in a simple flow chart 600 how to proceed if a rotor thrust needs to be reduced. A starting point may be a wake signal WS indicating a so-called wake situation. A wake situation is a situation in which a first wind turbine, which could be the upper most wind turbine 200 according to FIG. 2 is arranged in front of a second wind turbine, which may be the wind turbine 100 shown in the middle of FIG. 2. Accordingly, such second wind turbine is situated in lee of the first wind turbine, whereas the first wind turbine significantly influences the wind that reaches the second wind turbine. Accordingly, such wake signal WS may be generated by the second wind turbine or it may also be generated by a central controller as the central controller 122 shown in FIG. 2.

Such wake signal WS is inputted in a thrust evaluation block 602. This thrust evaluation block 602 will then start to generate a reduction signal RS. This reduction signal will be used in the pitch angle change block 604 and this pitch angle change block 604 will thus increase the pitch angle α from the normal common pitch angle to a throttled common pitch angle. Such pitch angle α is then used in the rotor speed selection block 606. In the rotor speed selection block 606 a throttled rotor speed curve will be selected according to the determined throttled common pitch angle. This may be done by selecting a corresponding throttled rotor speed curve. If there is no throttled rotor speed curve corresponding to the selected throttled common pitch angle, an interpolation or extrapolation may be performed based on two stored throttled rotor speed curves.

Each throttled rotor speed curve used in the rotor speed selection block 606 may be stored in a corresponding data storage. Each throttled rotor speed curve may be derived as explained with respect to FIG. 4 by looking for optimal operational points based on the ratio of Cp/Ct. This ratio is just a simple example that gives Cp and Ct a similar weighting, and instead any weighting can be given by using $Cp^x/Ct^y$ instead with x≠y.

If in the rotor speed selection block 606 a corresponding rotor speed is selected it is basically selected by selecting a corresponding rotor speed curve, i.e. a throttled rotor speed curve. As a result there is a new throttled common pitch angle and a new throttled common speed curve selected and the operational change block 608 will change the operation of the wind turbine accordingly However, according to the flow chart 600 it is suggested that after the operation of the wind turbine has been changed according to the operational change block 608 the thrust evaluation block 602 may determine whether the reduction of the thrust is enough or if further reduction is necessary and accordingly the reduction signal RS may be changed or not.

Accordingly, a solution is provided in order to reduce the rotor thrust of a first wind turbine which may in particular lead to a reduced turbulence for a second wind turbine in lee of said first wind turbine. This way it might be avoided that such second wind turbine in lee needs to be switched off in order to reduce its load caused by such turbulences.

However, the suggestion is not just to increase the pitch angle and let the wind turbine continue its operation using the normal and only rotor speed curve, but to propose an optimized operational point. Such optimized operational point can be formed by a general strategy for determining it and accordingly the whole operation may change to a throttled but besides that optimized operation.

It is also to be noted, that according to prior art it is known to just change or set a minimum pitch angle. Accordingly, that means that in case the pitch angle in the normal operation without thrust reduction was smaller than the minimum pitch angle, the pitch angle will then be increased to reach the minimum pitch angle. Based on that it is also possible and will be suggested according to one embodiment, to provide a minimum pitch angle. This will lead to changing the normal pitch angle to a throttled pitch angle which is having at least the value of the minimum pitch angle. However, in addition to that an optimal operational point is suggested, in particular as explained with respect to the diagram of FIG. 4. Based on that an adapted rotor speed curve may be chosen.

The invention claimed is:

1. A method for operating a wind turbine, comprising:
controlling the wind turbine, in partial load when wind speed is below a rated wind speed, using a rotor speed curve that defines a rotor speed for a respective operating point of the wind turbine and using a common pitch angle, wherein the wind turbine includes a rotor operable with variable rotor speed and having rotor blades with adjustable pitch angles, wherein the adjustable pitch angles are represented by the common pitch angle, and wherein the wind turbine produces electrical power from wind and the wind causes a rotor thrust, acting on the rotor, that depends on the rotor speed and the common pitch angle, wherein:
during the partial load and in a normal operational mode when the operation of the wind turbine is not throttled, a normal rotor speed curve is used as the rotor speed curve and a normal common pitch angle is used as the common pitch angle, and
during the partial load and in a throttled operational mode when the rotor thrust is to be limited, a throttled rotor speed curve, different from the normal rotor speed curve, is used as the rotor speed curve, and a throttled common pitch angle, different from the normal common pitch angle, is used as the common pitch angle to reduce the rotor thrust, wherein:
operation of the rotor is associated with a power coefficient,
a relationship between the power coefficient and a rotor thrust coefficient is defined as an optimization criterion, and
the throttled rotor speed curve is configured such that the optimization criterion is maximized.

2. The method according to claim 1, wherein the rotor speed curve defines a relationship between the rotor speed and one of:
electrical power to be produced,
a generator torque to be set, or
the wind speed.

3. The method according to claim 1, comprising:
limiting or reducing the rotor thrust by increasing the throttled common pitch angle with respect to the normal common pitch angle; or
configuring the throttled rotor speed curve such that for a given throttled pitch angle the electrical power is maximized.

4. The method according to claim 1, wherein:
the optimization criterion is defined according to at least one of:
a first ratio of the power coefficient to the rotor thrust coefficient,
a second ratio of a first function depending on the power coefficient to a second function depending on the rotor thrust coefficient, and
a third ratio of a weighted power coefficient to a weighted rotor thrust coefficient.

5. The method according to claim 1, wherein the throttled rotor speed curve is configured such that, depending on the throttled common pitch angle, a tip speed ratio is set such that the electrical power is maximized.

6. The method according to claim 5, wherein the throttled rotor speed curve is configured such that, depending on the throttled common pitch angle, the tip speed ratio is set such that a ratio of the power coefficient to the rotor thrust coefficient is maximized.

7. The method according to claim 5, comprising:
configuring the throttled rotor speed curve by applying an optimization criterion, wherein the optimization criterion is a pitch angle curve of the common pitch angle depending on the tip speed ratio and depending on the ratio of the power coefficient to the rotor thrust coefficient, wherein all possible common pitch angles depending on the tip speed ratio and depending on the ratio of the power coefficient to the rotor thrust coefficient form a three-dimensional surface and tuples of tip-speed-ratio values and pitch angle values correspond to a curve following a gradient.

8. The method according to claim 1, wherein the rotor speed curve is configured as depending on a ratio of the power coefficient to the rotor thrust.

9. The method according to claim 1, comprising:
controlling the wind turbine in a full load, when the wind speed is at or above the rated wind speed:
during the full load, operating the wind turbine in the normal operational mode with a rated rotor speed, a rated generator torque and rated power; and
during the full load, operating the wind turbine in the throttled operational mode with a throttled rotor speed below the rated rotor speed, increased generator torque above the rated generator torque or the rated power.

10. The method according to claim 1, wherein:
a set of throttled rotor speed curves is provided, each throttled rotor speed curve comprises the throttled common pitch angle; and
for operating the wind turbine, one throttled rotor speed curve of the set of throttled rotor speed curves is selected depending on an amount of the rotor thrust to be limited.

11. The method according to claim 1, wherein in a transient operation where operation shifts from the partial load to a full load, the throttled common pitch angle increases with increasing wind speed.

12. The method according to claim 11, wherein in the transient operation the pitch angle increases depending on an increase of the produced electrical power.

13. The method according to claim 12, wherein the pitch angle increases with a predefined pitch angle to power slope.

14. The method according to claim 1, comprising:
operating in the throttled operational mode based on at least one criterion or information from a list including:
an azimuth position of the wind turbine,
the wind speed,
gustiness intensity or turbulence intensity,
a wake-effect, according to which the wind turbine influences a wind field of a further wind turbine arranged in lee of the wind turbine,
a first signal received from the further wind turbine arranged in lee of the wind turbine,
a second signal received from a central farm controller of a wind farm including the wind turbine, and
a requirement for reducing noise emission.

15. A first wind turbine comprising:
a rotor operable with variable rotor speed and having rotor blades with adjustable pitch angles, the adjustable pitch angles being represented by a common pitch angle; and
a generator configured to generate electrical power from wind, wherein:
the wind causes a rotor thrust that acts on the rotor and that depends on the rotor speed and the common pitch angle,
a wind turbine controller is configured to operate the first wind turbine such that in partial load, when the wind is below rated wind speed, the first wind turbine is controlled using a rotor speed curve, defining the rotor speed for a respective operating point of the first wind turbine,
during the partial load and in a normal operational mode when the operation of the first wind turbine is not throttled, a normal rotor speed curve is used as the rotor speed curve and a normal common pitch angle is used as the common pitch angle, and
during the partial load and in a throttled operational mode when the rotor thrust is to be limited, a throttled rotor speed curve, different to the normal rotor speed curve, is used as the rotor speed curve and a throttled common pitch angle, different to the normal common pitch angle, is used as the common pitch angle to reduce the rotor thrust, wherein:
operation of the rotor is associated with a power coefficient,
a relationship between the power coefficient and a rotor thrust coefficient is defined as an optimization criterion, and
the throttled rotor speed curve is configured such that the optimization criterion is maximized.

16. An arrangement of wind turbines comprising:
the first wind turbine according to claim 15;
a second wind turbine arranged in proximity of the first wind turbine; and
a communication interface configured to connect the first and second wind turbines to facilitate an exchange information for operating at least the first wind turbine.

17. A wind farm comprising:
a plurality of wind turbines including at least the first wind turbine according to claim 15.

18. The wind farm according to claim 17, comprising:
a central controller configured to control the plurality of wind turbines.

* * * * *